United States Patent [19]

Gildea et al.

[11] Patent Number: 5,589,835
[45] Date of Patent: Dec. 31, 1996

[54] DIFFERENTIAL GPS RECEIVER SYSTEM LINKED BY INFRARED SIGNALS

[75] Inventors: David R. Gildea, Menlo Park; Lloyd H. Banta, Palo Alto, both of Calif.

[73] Assignee: Trimble Navigation Limited, Sunnyvale, Calif.

[21] Appl. No.: 359,604

[22] Filed: Dec. 20, 1994

[51] Int. Cl.$^6$ ...................................................... G01S 5/02
[52] U.S. Cl. .................................................................. 342/357
[58] Field of Search .............................................. 342/357

[56] References Cited

U.S. PATENT DOCUMENTS

| | | | |
|---|---|---|---|
| 5,345,244 | 9/1994 | Gildea et al. | 342/357 |
| 5,361,212 | 11/1994 | Class et al. | 342/357 |

Primary Examiner—Gregory C. Issing
Attorney, Agent, or Firm—David R. Gildea

[57] ABSTRACT

A GPS receiver system to determine and display a geographical differential Global Positioning System (DGPS) location where the components of the system are interconnected with an airwave infrared (IR) link. The system includes a GPS Smart Antenna receiver module to determine the geographical location of the module, a DGPS radio receiver to receive an airwave radio frequency DGPS signal having DGPS correction information, and a personal computing display to run an application program and to display the geographical DGPS location and application information that is useful to a user. The GPS Smart Antenna receiver module and the DGPS radio receiver are switched on and off from the personal computing display through the airwave IR link.

15 Claims, 2 Drawing Sheets

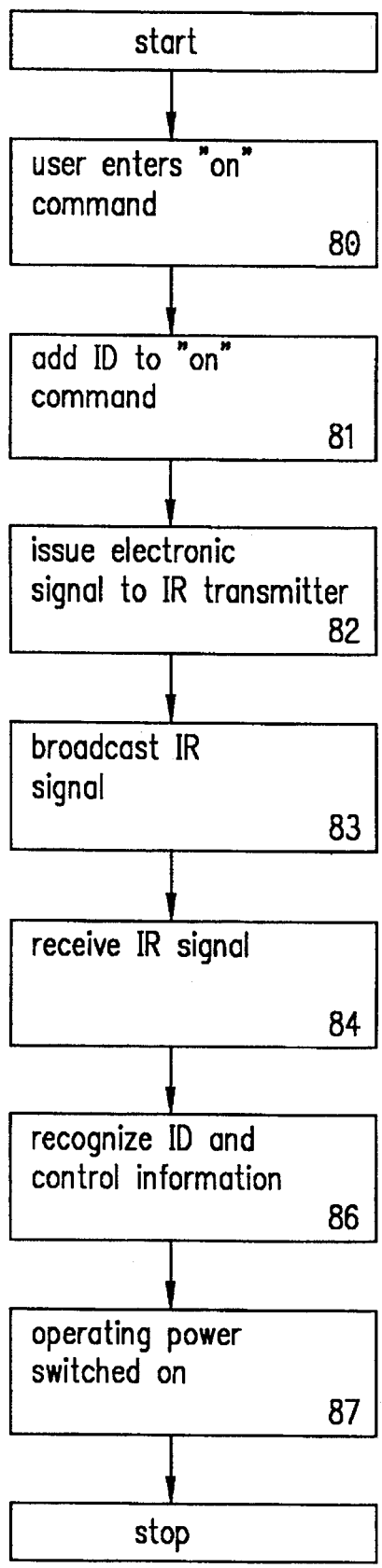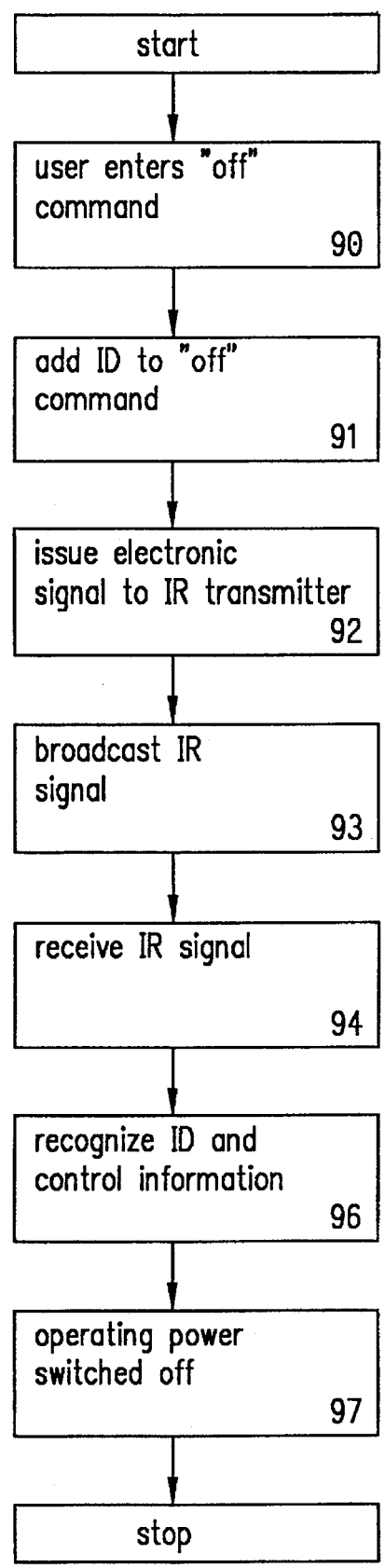
FIG. 2a
FIG. 2b

DIFFERENTIAL GPS RECEIVER SYSTEM LINKED BY INFRARED SIGNALS

CROSS REFERENCE OF RELATED APPLICATIONS

This application is related to a continuation in part application of David R. Gildea et al., Ser. No. 08/225125, filed Apr. 6, 1994, to its parent application Ser. No. 07/978274, filed Nov. 18, 1992, to an application of David R. Gildea, Ser. No. 08/157609, filed Nov. 23, 1993, and to an application of Glenn C. Steiner et al., Ser. No. 08/293048 filed Aug. 19, 1994. All of these applications are assigned to the assignee of the present application.

BACKGROUND OF THE INVENTION

1. Field of the Invention

The invention relates generally to Global Positioning System (GPS) receivers and more particularly to a GPS receiver system wherein a GPS Smart Antenna, a differential GPS radio receiver, and a personal computing device are coupled by an infrared link.

2. Description of the Prior An

GPS receivers are now used for many applications to provide a geographical location. The GPS receiver includes a GPS antenna to receive a GPS signal transmitted from one or more GPS satellites, a GPS engine to compute the geographical location of the antenna and the time of observation of that location, a display processor to convert the location and observation time into information that is useful for an application, and a display device to show the information to the user. The antenna must be positioned with a direct line of sight to the satellite or satellites from which the signals are received.

An important figure of merit in a GPS receiver is accuracy of the geographical location. The inherent accuracy of the GPS location measured by a commercial GPS receiver is approximately 20 meters. However, the United States Government currently employs selective availability (SA) to degrade the accuracy of the GPS location that is determined by a commercial GPS receiver. With SA the GPS location accuracy is approximately 100 meters. Several applications require a geographical location accuracy that is better than 100 meters or even 20 meters. For example, a 100 to 20 meter location error could lead to unintentional trespassing, make the return to an underground marker or mineral difficult, place a motor vehicle on the wrong block, or cause a navigator to choose an incorrect course for a boat or an airplane.

Fortunately, both the inherent and the SA-degraded GPS location accuracy can be improved by the application of differential GPS (DGPS) corrections. In general, the DGPS corrections are derived by taking the difference between a GPS location determined by a GPS receiver located at a reference site and a surveyed location of the reference site. Various airwave radio frequency signals are now available from a variety of sources to provide the DGPS corrections in real time to a mobile GPS receiver system. A DGPS radio receiver included as a part of a GPS receiver system receives the airwave signal carrying the DGPS corrections. The mobile GPS receiver system uses the DGPS corrections to correct the GPS location. The corrected GPS location, termed a "DGPS location" has an accuracy in a range of 10 constructions for the DGPS radio receiver are required depending upon which of the various airwave signals the DGPS radio receiver is to receive.

Another important figure of merit for a GPS receiver is portable computing power. In many applications, the GPS location or the DGPS location is processed to provide further information that is useful to a user. For example, a geographic information system (GIS) application may store the geographical locations and attributes of map features in the form of an electronic map. A navigation application may need to compute a distance and a direction to a selected map feature or to a map feature having a selected set of the attributes. Such applications require a large memory and are most expediently programmed in a processing system that has the power to run a standard operating system, such as DOS, DOS with Windows, Macintosh, GeoWorks, and others. Fortunately, personal computing devices have recently become available that have the portability, memory, and processing power to run these applications.

Several formats of GPS receiver systems exist or have been proposed that include system components of the GPS receiver, the DGPS radio receiver, and the personal computing device in order to provide DGPS location capability, portability, and processing power. In a first format, the system components are integrated into a single unit. Such units may be "hardwired" into a single unit, or the GPS receiver and the DGPS radio receiver may be housed on Personal Computer Memory Card Interface Association (PCMCIA) cards that plug into the personal computing device to give the effect of a single unit. An advantage of using PCMCIA cards, is that the various constructions of DGPS radio receivers do not prevent the manufacture of a standard construction of the GPS receiver on a separate card. A problem with this format is that the user must remain in the open to preserve a direct line of sight from the GPS antenna to one or more GPS satellites while operating and observing the personal computing device. One solution to this problem is to place the GPS antenna in a separate unit, connected with the GPS receiver system by a cable. In a second format, the system components are each housed in separate units and interconnected with cables. This format retains the advantages of separating the GPS antenna from the system and of having a standardized construction of the GPS receiver. However, cables and their connections are expensive, prone to breakage or malfunction, and inconvenient for some applications.

In a third format, the GPS receiver and the DGPS radio receiver components are integrated into a GPS/DGPS Smart Antenna unit. The GPS/DGPS Smart Antenna unit may use a wireless radio frequency or infrared (IR) frequency link to connect to the personal computing device. The IR frequency link has the advantage that it does not interfere with reception of airwave radio frequency signals used for navigation and does not require testing or certification by the FAA or FCC. This format eliminates the expense, reliability problems, and inconvenience of the cable but, does not allow a standard construction of the GPS receiver component.

There is a need for a GPS receiver system to provide a geographical DGPS location, where the system includes a GPS receiver having a standard construction and where the system components are interconnected by an infrared (IR) link.

SUMMARY OF THE INVENTION

It is therefore an object of the present invention to provide a GPS receiver system to determine and display a geographical DGPS location where the system includes a GPS Smart Antenna receiver module, a DGPS radio receiver, and a personal computing display in separate packages each communicating with the others without cables by using an airwave infrared (IR) link.

Another object is to provide internal batteries to supply operating power within the GPS Smart Antenna receiver module and within the DGPS radio receiver and to control the supply of operating power within the module and within the radio from the personal computing display through the IR link.

Briefly, the preferred embodiment includes the GPS Smart Antenna receiver module to determine the geographical location of the module, the DGPS radio receiver to receive an airwave radio frequency DGPS signal having DGPS correction information, and the personal computing display to run an application program and to display the geographical DGPS location and application information that is useful to a user. The GPS Smart Antenna module, the DGPS radio receiver, and the personal computing display communicate information through the airwave IR link.

An advantage of the present invention is that the GPS Smart Antenna receiver module, the DGPS radio receivers, and the personal computing display are packaged separately, thereby allowing various constructions of DGPS radio receivers while retaining standardization of the construction of the GPS receiver.

Another advantage is that the GPS receiver, the DGPS radio receiver, and the personal computing display communicate via a cableless IR link, thereby eliminating the cost, failure potential, and inconvenience of cable connections.

Another advantage is that the lifetimes of the internal batteries in the GPS Smart Antenna receiver module and in the DGPS radio receiver may be prolonged by controlling the supply of operating power within the module and within the radio receiver from the personal computing display through the IR link.

These and other objects and advantages of the present invention will no doubt become obvious to those of ordinary skill in the art after having read the following detailed description of the preferred embodiments which are illustrated in the various figures.

IN THE DRAWINGS

FIG. 2a is a flow chart of the steps to turn on the operating power in a GPS Smart Antenna receiver module and in a DGPS radio receiver that are a part of the system of FIG. 1; and FIG. 2b is a flow chart of the steps to turn off the operating power in the GPS Smart Antenna receiver module and in the DGPS radio receiver of FIG. 2a.

DETAILED DESCRIPTION OF THE PREFERRED EMBODIMENTS

Figure 1:
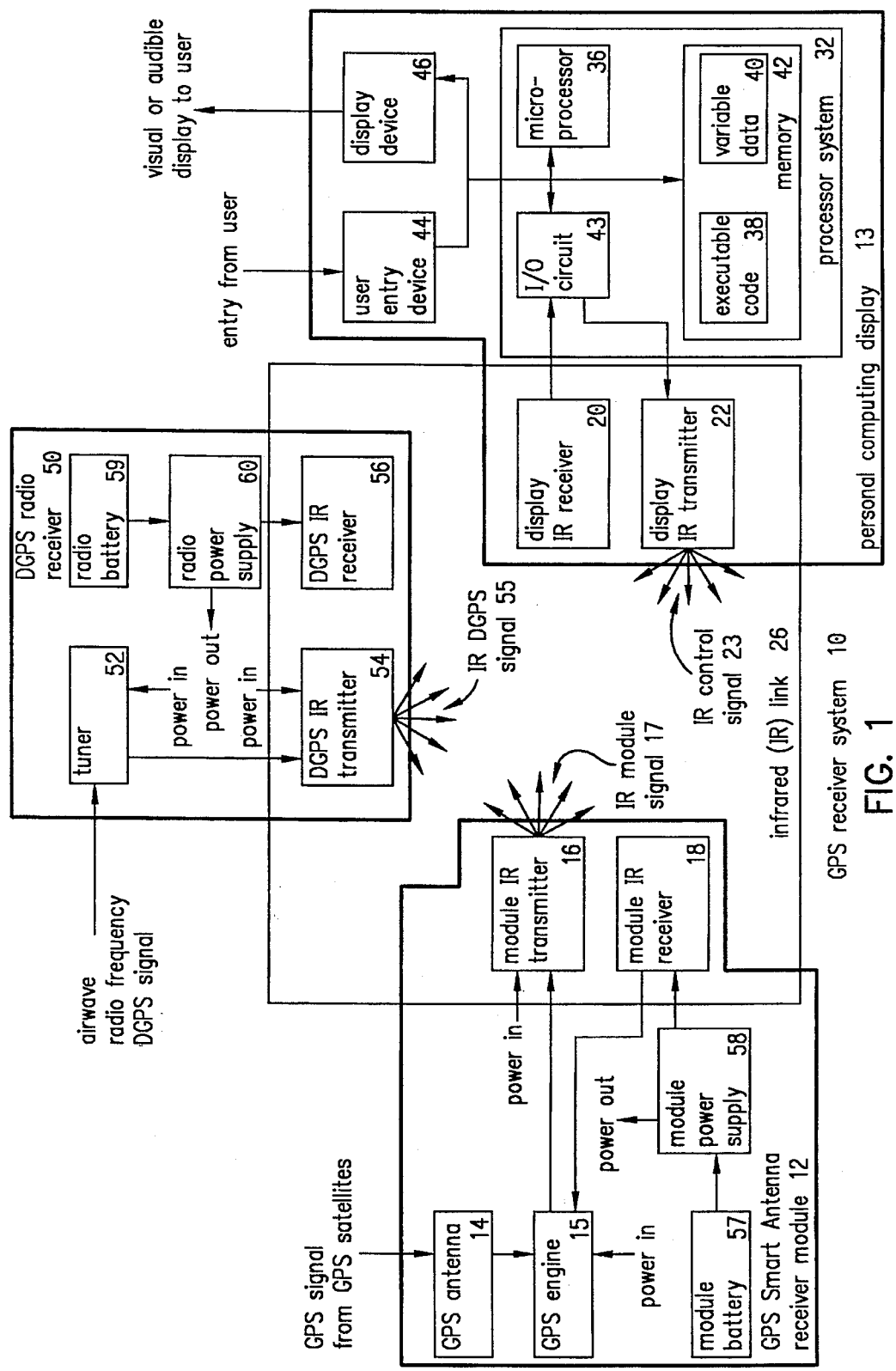
FIG. 1 is a block diagram of a GPS receiver system providing a geographical differential GPS location.

FIG. 1 illustrates a GPS receiver system of the present invention and referred to by the general reference number 10. The system 10 includes a GPS Smart Antenna receiver module 12 to determine a geographical location of the module 12 and a personal computing display 13 to display the location to a human user. The module 12 is housed in a single waterproof package, no more than 15 centimeters high and no more than 15 centimeters wide in any dimension perpendicular to the height. The module 12 includes a GPS antenna 14 to receive an airwave GPS signal, having information for the determination of a GPS location, from a plurality of GPS satellites and to issue a responsive electronic antenna output signal to a GPS engine 15. The GPS engine 15 computes the geographic location from the information in the GPS signal and issues data indicative of the location in an electronic signal to a module infrared (IR) transmitter 16. Several GPS antennas 14 and the GPS engines 15 that are suitable for the construction of the present invention are commercially available, such as a model "SV6" manufactured by Trimble Navigation that includes both the GPS antenna 14 and the GPS engine 15, a model "NavCore Microtracker" manufactured by Rockwell that includes the GPS engine 15, and a variety of models manufactured by MicroPulse located in Camarillo, Calif. that include the GPS antenna 14.

The module IR transmitter 16 transmits an IR module signal 17, including the location data, by illuminating a cone of local airspace emerging from the module IR transmitter 16 with energy in the IR wavelength range. The module 12 includes a module IR receiver 18 to receive IR signals having information to control the operation of the module 12. The personal computing display 13 includes a display IR receiver 20 to receive IR signals in the local airspace including the IR module signal 17 and a display IR transmitter 22 to transmit an IR control signal 23 by illuminating a cone of local airspace with IR energy. The module IR transmitter 16 and the display IR transmitter 22 may be constructed from a light emitting diode (LED), such as a "TSUS5402" or a "TSHA5503" manufactured by Telefunken Semiconductors driven by a transistor, using application information available from Telefunken. The use of multiple LEDs in the module IR transmitter 16 and/or the display IR transmitter 22 can be used to widen the cone of the IR module signal 17 and/or the IR control signal 23, respectively IR receiver 18 and the display IR receiver 20 may be constructed from a photodiode, such as a "BPV23F" or a BPV23NF" manufactured by Telefunken Semiconductors, and an "SIRComm2" integrated circuit IR receiver manufactured by Irvine Sensors using application information available from Telefunken or Irvine. Alternatively, a model "CS8130 Multi- Standard Infrared Transceiver" manufactured by Crystal Semiconductors can be used with the above-identified LED and photodiode for both the module IR transmitter 16 and the module IR receiver 18 and/or for both the display IR transmitter 22 and the display IR receiver 20. Another source of parts is Hewlett-Packard which provides licenses to use its serial infrared communications interface (SIR) transceivers disclosed in U.S. Pat. No. 5,075,792, the teachings of which are incorporated herein by reference. The module IR transmitter 16, the module IR receiver 18, the display IR receiver 20, the display IR transmitter 22, the IR module signal 17, and the IR control signal 23 are included in an IR link 26 to communicate information between components of the system 10 including the GPS Smart Antenna receiver module 12 and the personal computing display 13.

The personal computing display 13 includes a processor system 32 for receiving, processing, and issuing electronic signals. The processor system 32 includes a microprocessor 36 that operates in a conventional manner to receive electronic signals and to process the signals according to pre-programmed instructions in an executable code 38 and variable data 40 stored in a memory 42. An I/O circuit 43, such as a Universal Asynchronous/synchronous Receiver Transmitter (UART), available as an electronic part from many vendors, converts parallel data electronic signals from the microprocessor 36 to serial data electronic signals to the display IR receiver 20 and converts serial data electronic signals from the display IR receiver 20 to parallel data electronic signals to the microprocessor 36. A user entry device 44, such as a keyboard, a keypad, a touchscreen, a switch, a microphone, or a combination thereof, is operated by a human user to enter information. The user may enter program information, such as a selected geographical location. The user entry device 44 responds by issuing a user device electronic signal to the microprocessor 36. The executable code 38 includes instructions to receive the electronic signal, to store the selected geographical location in variable data 40 and to compute user output information of a distance and a direction between the location of the module 12 and the selected location. The microprocessor 36 issues electronic display signals to a display device 46, such as a liquid crystal (LCD), light emitting diode LED display, or an equivalent to display the user output information in a form that is visible to the human user. Optionally, the display device 46 includes a speaker to display the information in a form that is audible to the human user. In a preferred embodiment, the processor system 32, the user entry device 44, the display device 46, the display IR receiver 20, and the display IR transmitter 22 are included in a commercially available personal digital computing device, such as are manufactured by several companies including Casio, Apple, Hewlett-Packard, and Sony and known by various names, such as a digital assistant, a personal digital assistant (PDA), a personal information manager (PIM), a notebook computer, a sub-notebook computer, a PCMCIA computer, a "Zoomer", a "Newton," a "Dataman," or an equivalent. Optionally, the display IR receiver 20 and the display IR transmitter 22 may be included as an accessory to the commercially available device.

The GPS Smart Antenna receiver module 12 is capable of providing a GPS location having an accuracy of approximately 20 meters with selective availability (SA) off or an accuracy in a range of 300 to 50 meters, depending upon several SA parameters set by the United States Government, with SA on. Differential GPS (DGPS) corrections may be used to improve the GPS location accuracy to a DGPS location accuracy in a range of 10 meters to a few centimeters, depending upon the methods used for determining and transmitting the DGPS corrections. In general, the DGPS corrections are determined by comparing a GPS location computed by a GPS receiver located at a reference site with a surveyed location of the reference site. The DGPS corrections so determined are then broadcast in an airwave radio frequency DGPS signal.

A DGPS radio receiver 50 receives the airwave DGPS signal having the DGPS corrections. A tuner 52 demodulates and decodes the airwave DGPS signal and provides an electronic DGPS correction signal. Several companies, such as Differential Corrections Incorporated (DCI) and AccQPoint, provide real time DGPS corrections that are carried on a subcarrier of an FM signal generated and broadcast from certain FM broadcast stations. The correction information is encrypted and then modulated onto the subcarrier using a format, such as the radio data system (RDS), and a data structure, such as the radio technical commission for maritime services (RTCM) 104. The RDS format is described in *RDS—The Engineering Concept,* 2nd edition, February, 1990, published by the Technical Publication Unit, BBC Engineering Training Department, Wood Norton, Evesham, Worcestershire, WR11 4TF, Great Britain which is incorporated herein by reference. The RTCM data structure is described in the *RTCM Recommended Standards for Differential NavStar GPS Service,* version 2, RTCM Special Committee No. 104, Jan. 1, 1990, published by the RTCM, PO Box 19087, Washington, D.C. 20036, U.S.A. which is incorporated by reference herein. The FM subcarrier signals are available to commercial users throughout most of the industrialized world by paying a periodic fee for the key to decrypt the information. The tuner 52 is constructed for converting the FM subcarrier signal to an electronic DGPS correction signal including data indication of the DGPS corrections is available from DCI, AccQPoint, or Trimble Navigation. Another source of DGPS corrections in an airwave radio frequency DGPS signal is the United States Coast Guard (U.S. C. G.). The U.S. C. G. determines the DGPS corrections at certain radio direction finder (RDF) beacon stations and broadcasts the corrections using the RTCM 104 data structure without encryption as modulation on the RDF beacon signals transmitted from those sites. Similar systems are in use worldwide. The RDF beacon signals are currently used for marine navigation and are available to the public without charge in certain geographical areas near the United States and foreign coastlines. The tuner 52 constructed for converting the RDF beacon signal to the electronic DGPS correction signal is commercially available from several manufacturers including Magnavox and Trimble Navigation. Another source of DGPS corrections is the OMNISTAR system provided by John C. Chance & Associates company of Houston, Tex. The OMNISTAR system includes the DGPS corrections in an airwave radio frequency DGPS signal broadcast from geostationary satellites. The tuner 52 constructed to receive the OMNISTAR signal is available from the John C. Chance company. Several other systems user tuners commonly called "radio/modems" to receive airwave radio frequency DGPS signals in the UHF frequency range that include the DGPS corrections. Two such systems and tuners 52 to receive the airwave UHF DGPS signals are provided by GLB Electronics in Buffalo, N.Y. and Pacific Crest Corporation in Sunnyvale, Calif.

The tuner 52 typically includes an antenna to receive the airwave radio frequency DGPS signal, a demodulator to demodulate the modulation carried by the signal, a decoder to decode the DGPS corrections from the modulation, and an I/O circuit to issue the electronic DGPS correction signal to the DGPS IR transmitter 54. The DGPS IR transmitter 54 issues a responsive IR DGPS signal 55 by illuminating a cone of local airspace with energy in the IR wavelength range. The DGPS radio receiver 50 includes a DGPS IR receiver 56 to receive an IR control signal that may control the DGPS radio receiver 50. The DGPS IR transmitter 54 and the DGPS IR receiver 56 be may constructed similarly to the module IR receiver 18 and the module IR transmitter 16, respectively. The DGPS IR transmitter 54, the DGPS IR receiver 56, and the IR DGPS signal 55 are included in the IR link 26.

In the preferred embodiment, the GPS engine 15 has the capability of computing a geographical DGPS location based upon the GPS location information in the GPS signal and the DGPS corrections. This capability, termed "differential ready," is available in the Trimble SV6 noted above. The DGPS corrections are provided to the GPS engine 15 in an electronic DGPS correction signal from the module IR receiver 18 responsive to the IR DGPS signal 55. In another embodiment, the executable code 38 in the processor system 32 includes instructions to compute the DGPS location based upon the GPS location received from the module 12 and the DGPS corrections received in an electronic DGPS correction signal from the display IR receiver 20 responsive to the IR DGPS signal 55.

The user may operate the user entry device 44 to enter control information. The control information that may be entered includes a command to switch the module 12 (and/or the DGPS radio receiver 50 the elements of which are shown within parentheses) between a normal operation mode and standby mode by remotely enabling or disabling the operating power. The executable code 38 in the personal computing display 13 includes instructions for the microprocessor 36 to receive the user device electronic signal issued by the user entry device 44 and to issue a responsive electrical control signal. The I/O circuit 43 receives the electronic control signal and issues a responsive electronic signal to the display IR transmitter 22 which issues a responsive the IR control signal 23. The module IR receiver 18 (DGPS IR receiver 56) receives the IR control signal 23 and issues a representative signal to the module power supply 58 (radio power supply 60). The module power supply 58 (radio power supply 60) responsively enables or disables the flow of operating power from an internal module battery 57 (radio battery 59) to the module IR transmitter 18 (DGPS IR transmitter 54) and to the GPS engine 15 (tuner 52) for normal operation or for standby, respectively. In order to be able to receive and to act upon the control information, the module IR receiver 18 (DGPS IR receiver 56) and the module power supply 58 (radio power supply 60) continue to receive operating power from the module battery 57 (radio battery 59) during the standby mode. It is important that the power consumption of the module IR receiver 18 (DGPS IR receiver 56) and the module power supply 58 (radio power supply 60) be as low as practical in the standby mode in order to prolong the life of the module battery 57 (radio battery 59). The module power supply 58 (radio power supply 60) includes an on/off switch, operable by a human user, to override the control information to switch the flow of operating power on and off. Typically, the module 12, the DGPS radio receiver 50, and the personal computing display 13 include a capability of "listening" for an IR signal in the IR link 26 before beginning to transmit an IR signal so that the IR signals do not interfere with each other.

FIG. 2a illustrates the steps in a method for controlling the GPS Smart Antenna receiver module 12 and/or the DGPS radio receiver 50 to enable operating power for normal operation. The steps in the method are described for the elements of the module 12 (and for the elements of the radio receiver 50 shown within parentheses). Initially, the module 12 (radio receiver 50) is in a standby mode where the flow of operating power from the module battery 57 (radio battery 59) to the GPS engine 15 (tuner 52) and the module IR transmitter 16 (DGPS IR transmitter 54) is disabled. During the standby mode, the module IR receiver 18 (DGPS IR receiver 56) and the module power supply 58 (radio power supply 60) continue to receive operating power from the module battery 57 (radio battery 59) in order to receive control information. In step 80, a user operates the user entry device 44 to enter a command to switch the module 12 (radio receiver 50) to a normal operating mode. The user entry device 44 responds to the user operation by issuing a user device electronic signal to the microprocessor 36. In step 81, the microprocessor 36 processes instructions in the executable code 38 to add an identification (ID) to the control information to identify the component that is to use to information. In step 82, the microprocessor 36 issues an electronic control signal including the control information to the I/O circuit 43. The I/O circuit 43 converts the electronic control signal to a serial data format and issues a serial data signal to the display IR transmitter 22. In step 83, the display 1R transmitter 22 broadcasts the IR control signal 23 to carry the information by illuminating the IR link 26 with signal energy in the IR wavelength range. In step 84, the module IR receiver 18 (DGPS IR receiver 56) receives the IR control signal 23 and issues a responsive electronic signal to the module power supply 58 (radio power supply 60). In step 86, the module power supply 58 (radio power supply 60) recognizes the ID that identifies the module 12 (radio receiver 50) and that the control information is a command to switch power on. In step 87, the module power supply 58 (radio power supply 60) enables the flow of operating power from the module battery 57 (radio battery 59) to the GPS engine 15 (tuner 52) and to the module IR transmitter 16 (DGPS IR transmitter 54).

FIG. 2b illustrates the steps in a method for controlling the GPS Smart Antenna receiver module 12 and/or the DGPS radio receiver 50 to disable operating power for the standby mode. The steps in the method are described for the elements of the module 12 (and for the elements of the radio receiver 50 shown within parentheses). Initially, the module 12 (radio receiver 50) is operating normally. In step 90, a user operates the user entry device 44 to enter a command to switch the module 12 (radio receiver 50) to the standby mode. The user entry device 44 responds to the user operation by issuing a user device electronic signal to the microprocessor 36. In step 91, the microprocessor 36 processes instructions in the executable code 38 to add an identification (ID) to the control information to identify the component that is to use the information. In step 92, the microprocessor 36 issues an electronic control signal including the control information to the I/O circuit 43. The I/O circuit 43 converts the electronic control signal to a serial data format and issues a serial data signal to the display IR transmitter 22. In step 93, the display IR transmitter 22 broadcasts the IR control signal 23 to carry the information by illuminating the 1R link 26 with signal energy in the IR wavelength range. In step 94, the module lit receiver 18 (DGPS IR receiver 56) receives the IR control signal 23 and issues a responsive electronic signal to the module power supply 58 (radio power supply 60). In step 96, the module power supply 58 (radio power supply 60) recognizes the ID that identifies the module 12 (radio receiver 50) and that the control information is a command to switch to the standby mode. In step 97, the module power supply 58 (radio power supply 60) disables the flow of operating power from the module battery 57 (radio battery 59) to the GPS engine 15 (tuner 52) and to the module IR transmitter 16 (DGPS IR transmitter 54).

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A GPS receiver system to determine and display a geographical differential Global Positioning System (DGPS) location where the system is interconnected by an airwave infrared (IR) link, the system including:

a DGPS radio receiver to receive an airwave radio frequency DGPS signal from a source external to the system, said airwave DGPS signal including DGPS corrections, and to provide an airwave infrared (IR) DGPS signal having data indicative of said DGPS corrections;

a GPS Smart Antenna module to receive an airwave GPS signal including GPS location information from a plurality of GPS satellites, to receive said IR DGPS signal, to use said DGPS corrections and said GPS location information to compute said DGPS location, said DGPS location having a better location accuracy better than a location computed from said GPS location information without said DGPS corrections, and to provide data indicative of said DGPS location in an airwave infrared (IR) module signal; and a personal computing display to receive said IR module signal and said IR DGPS signal and to display said DGPS location in a form that is visibly or audibly perceptible to a human being.

2. The apparatus of claim 1, wherein the GPS Smart Antenna module includes:

a GPS antenna to receive said airwave GPS signal and to provide a responsive electronic antenna output signal;

a module IR receiver to receive said IR DGPS signal and to convert said IR DGPS signal into a responsive electronic DGPS signal;

a GPS engine to receive said antenna output signal and said electronic DGPS signal, to use said GPS location information and said DGPS correction data to determine said DGPS location, and to issue an electronic location signal having data indicative of said DGPS location;

a module IR transmitter to receive said location signal and to issue said IR module signal; and a module power supply to receive operating power from a module battery and to issue operating power to at least one module element including the GPS antenna, the GPS engine, and the module IR transmitter.

3. The apparatus of claim 2, wherein the module IR receiver receives an airwave IR, first control signal from a source external to the module, said IR first control signal having first control information to enable or to disable said operating power to said module element and issue an electronic first control signal having said first control information; and the module power supply, receives said electronic first control signal and responsively enables or disables said operating power to said module element.

4. The apparatus of claim 3, wherein the personal computing display includes:

means, operable by a human user, for receiving said first control information from said human user and for providing said IR first control signal.

5. The apparatus of claim 1, wherein the personal computing display includes:

means, operable by a human user, for entering a selected geographical location; and means for computing at least one of a distance from said DGPS location to said selected geographical location and a direction from said DGPS location to said selected geographical location.

6. The apparatus of claim 1, wherein the DGPS radio receiver includes:

a tuner to receive said airwave radio frequency DGPS signal and to provide an electronic DGPS signal having data indicative of said DGPS corrections; and a DGPS IR transmitter to receive said electronic DGPS signal and to issue said IR DGPS signal.

7. The apparatus of claim 6, wherein the DGPS radio receiver further includes:

a DGPS IR receiver to receive an airwave IR second control signal from a source external to the DGPS radio receiver, said IR second control signal having second control information to enable or to disable operating power to at least one radio element of the tuner and the DGPS IR transmitter; and a DGPS power supply to receive operating power from a radio battery, to receive said electronic second control signal, and to respond to said second control information by enabling or disabling said operating power to said radio element.

8. The apparatus of claim 3, wherein the personal computing display includes:

means, operable by a human user, for receiving said second control information and for providing said IR second control signal.

9. The apparatus of claim 1, wherein:

said airwave radio frequency DGPS signal is included in an FM broadcast radio signal transmitted from an FM station.

10. The apparatus of claim 1, wherein:

said airwave radio frequency DGPS signal is included in a radio direction finder (RDF) beacon signal transmitted from an RDF beacon station.

11. A method for providing a geographical DGPS location of a GPS receiver system including a GPS Smart Antenna module, a DGPS radio receiver, and a personal computing display, the method including the steps of:

providing, from a source external to said GPS receiver system, an airwave radio frequency DGPS signal including DGPS corrections usable to improve the accuracy of a geographical GPS location;

receiving said airwave radio frequency DGPS signal in said DGPS radio receiver;

converting said radio frequency DGPS signal into an electrical DGPS signal having data indicative of said DGPS corrections;

transmitting, from said DGPS radio receiver, an airwave infrared (IR) DGPS signal having said DGPS corrections data;

receiving said IR DGPS signal in said GPS Smart Antenna module;

receiving, in said GPS Smart Antenna module, an airwave GPS signal having GPS location information from a plurality of GPS satellites;

determining said DGPS location based upon said GPS location information and said DGPS corrections data;

transmitting an airwave IR module signal having data indicative of said DGPS location from said GPS Smart Antenna module;

receiving said IR module signal in said personal computing display; and displaying with said personal computing display said DGPS location in a form that is visibly or audibly perceptible to a human user.

12. The method of claim 11, wherein the step of determining a DGPS location further includes steps of:

receiving said airwave GPS signal with a GPS antenna included in said GPS Smart Antenna module;

issuing an electronic antenna output signal from said GPS antenna, said antenna output signal responsive to said GPS signal;

receiving said IR DGPS signal in a module IR receiver included in said GPS Smart Antenna module;

issuing an electronic DGPS signal from said module IR receiver, said electronic DGPS signal responsive to said IR DGPS signal;

receiving said antenna output signal and said IR DGPS signal in a GPS engine included in said GPS Smart Antenna module;

computing said DGPS location in said GPS engine;

issuing an electronic location signal having data indicative of said DGPS location from said GPS engine;

receiving said electronic location signal in a module IR transmitter;

transmitting said airwave IR module signal responsive to said electronic location signal from said module IR transmitter included in said GPS Smart Antenna module;

receiving operating power in a module power supply included in said GPS Smart Antenna module from a module battery included in said module; and supplying a flow of operating power from said module power supply to at least one module element including said GPS antenna, said GPS engine, and said module IR transmitter.

13. The method of claim 12, wherein the step of supplying operating power further includes steps of:

providing, from said personal computing display, an airwave IR first control signal having information for controlling said flow of operational power to enable said flow or to disable said flow;

receiving said airwave IR first control signal with a module IR receiver included in said GPS Smart Antenna module;

issuing an electronic first control signal from said module IR receiver, said electronic first control signal responsive to said IR first control signal;

receiving said electronic first control signal in said module power supply; and controlling said flow of operating power to said module element in response to said first control information to enable said flow or to disable said flow.

14. The method of claim 11, wherein the step of converting said radio frequency DGPS signal further includes steps of:

receiving said airwave radio frequency DGPS signal in a tuner included in said DGPS radio receiver;

issuing an electronic DGPS signal from said tuner, said electronic DGPS signal having data indicative of said DGPS corrections;

receiving said electronic DGPS signal in a DGPS IR transmitter included in said DGPS radio receiver;

transmitting said IR DGPS signal from said DGPS IR transmitter, said IR DGPS signal responsive to said electronic DGPS signal; and receiving operating power in a radio power supply included in said DGPS radio receiver from a radio battery included in said DGPS radio receiver; and supplying a flow of operating power from said radio power supply to at least one radio element including said tuner and said DGPS IR transmitter.

15. The method of claim 14, wherein the step of supplying a flow of operating power further includes steps of:

providing, from said personal computing display, an airwave IR second control signal having information for controlling said flow of operational power to enable said flow or to disable said flow;

receiving said airwave IR second control signal in a DGPS IR receiver included in said DGPS radio receiver;

issuing an electronic second control signal from said DGPS IR transmitter, said electronic second control signal responsive to said IR second control signal;

receiving said electronic second control signal in said radio power supply; and controlling said flow of operating power to said radio element in response to said second control information to enable said flow or to disable said flow.

* * * * *